United States Patent [19]

Margulis

[11] Patent Number: 5,379,443
[45] Date of Patent: Jan. 3, 1995

[54] MICROPROCESSOR PROVIDING ENCODED INFORMATION ON BYTE ENABLE LINES INDICATING WHETHER READING CODE OR DATA, LOCATION OF CODE/DATA ON DATA LINES, AND BIT WIDTH OF CODE/DATA

[75] Inventor: Neal Margulis, Santa Clara, Calif.

[73] Assignee: Intel Corporation, Santa Clara, Calif.

[21] Appl. No.: 133,771

[22] Filed: Oct. 8, 1993

Related U.S. Application Data

[63] Continuation of Ser. No. 942,380, Sep. 9, 1992, abandoned, which is a continuation of Ser. No. 477,644, Feb. 9, 1990, abandoned.

[51] Int. Cl.$^6$ .................. G06F 15/76; G06F 12/00
[52] U.S. Cl. .................. 395/800; 395/425; 364/232.8; 364/925.5; 364/925.6; 364/927.8; 364/DIG. 2
[58] Field of Search .................. 395/800, 425

[56] References Cited

U.S. PATENT DOCUMENTS

| | | | |
|---|---|---|---|
| 3,715,727 | 2/1973 | Yu | 395/275 |
| 4,315,308 | 2/1982 | Jackson | 395/325 |
| 4,349,873 | 9/1982 | Gunter et al. | 364/200 |
| 4,825,438 | 4/1989 | Bennett et al. | 371/8 |
| 4,959,860 | 9/1990 | Watters et al. | 380/4 |
| 4,991,085 | 2/1991 | Pleua et al. | 364/200 |
| 5,059,782 | 10/1991 | Fukuyama | 250/214 |
| 5,065,356 | 11/1991 | Puckette | 395/800 |
| 5,129,069 | 7/1992 | Helm et al. | 395/400 |
| 5,170,477 | 12/1992 | Potter et al. | 395/425 |

*Primary Examiner*—Thomas G. Black
*Assistant Examiner*—Paul Harrity
*Attorney, Agent, or Firm*—Blakely, Sokoloff, Taylor & Zafman

[57] ABSTRACT

A method for signaling the type of access sought by a microprocessor to external memory. A microprocessor can read from or write into external memory. When the microprocessor initiates a read or write cycle, access signals indicating: the read or write cycle, the lower order address bits of the sought after code or data, whether code or data is sought, and bit-width of the sought after code or data, are provided to the inventions byte enable chaser circuit. If a read cycle has been initiated the byte enable chaser circuit encodes the signals into predetermined bit patterns and outputs the bit patterns on the microprocessor's byte enable signal pins. The bit-patterns are available for each bus cycle and specify whether code or data is sought, the length of the sought string, and the lower order address bits of the strings address. If a write cycle is initiated the byte enable signed pins indicate which byte(s) of the data bus are to be written into memory.

8 Claims, 3 Drawing Sheets

FIGURE 2

DATA ACCESS ENCODING

| INPUT TO BYTE ENABLE CHASER CIRCUIT | | | | | | | | OUTPUT FROM BYTE ENABLE CHASER CIRCUIT | | | | | | | |
|---|---|---|---|---|---|---|---|---|---|---|---|---|---|---|---|
| ACCESS TYPE | | | | Lower Order Address Bits (Implied) | | | CODE/ DATA | $BE_7$ | $BE_6$ | $BE_5$ | $BE_4$ | $BE_3$ | $BE_2$ | $BE_1$ | $BE_0$ |
| DS8 | DS16 | DS32 | DS64 | A2 | A1 | A0 | | | | | | | | | |
| 1 | X | X | X | X | X | X | 1 | 1 | 1 | 1 | 1 | 1 | 1 | 1 | X |
| 1 | X | X | X | X | X | 1 | 1 | 1 | 1 | 1 | 1 | 1 | 1 | X | 1 |
| 1 | X | X | X | X | 1 | X | 1 | 1 | 1 | 1 | 1 | 1 | X | 1 | 1 |
| 1 | X | X | X | X | 1 | 1 | 1 | 1 | 1 | 1 | 1 | X | 1 | 1 | 1 |
| 1 | X | X | X | 1 | X | X | 1 | 1 | 1 | 1 | X | 1 | 1 | 1 | 1 |
| 1 | X | X | X | 1 | X | 1 | 1 | 1 | 1 | X | 1 | 1 | 1 | 1 | 1 |
| 1 | X | X | X | 1 | 1 | X | 1 | 1 | X | 1 | 1 | 1 | 1 | 1 | 1 |
| 1 | X | X | X | 1 | 1 | 1 | 1 | X | 1 | 1 | 1 | 1 | 1 | 1 | 1 |
| X | 1 | X | X | X | X | X | 1 | 1 | 1 | 1 | 1 | 1 | 1 | X | X |
| X | 1 | X | X | X | 1 | X | 1 | 1 | 1 | 1 | 1 | X | X | 1 | 1 |
| X | 1 | X | X | 1 | X | X | 1 | 1 | 1 | X | X | 1 | 1 | 1 | 1 |
| X | 1 | X | X | 1 | 1 | X | 1 | X | X | 1 | 1 | 1 | 1 | 1 | 1 |
| X | X | 1 | X | X | X | X | 1 | 1 | 1 | 1 | 1 | X | X | X | X |
| X | X | 1 | X | 1 | X | X | 1 | X | X | X | X | 1 | 1 | 1 | 1 |
| X | X | X | 1 | X | X | X | 1 | X | X | X | X | X | X | X | X |

1 = Data

FIGURE 3

| CODE ACCESS ENCODING ||||||
| --- | --- | --- | --- | --- | --- |
| INPUT TO BYTE ENABLE CHASER CIRCUIT |||| | OUTPUT FROM BYTE ENABLE CHASER CIRCUIT |
| ACCESS TYPE | Lower Order Address Bits (Implied) || CODE/ DATA | | |
| DS8 DS16 DS32 DS64 | A2 A1 A0 | | | | $BE_7$ $BE_6$ $BE_5$ $BE_4$ $BE_3$ $BE_2$ $BE_1$ $BE_0$ |
| 𝒸 𝒸 1 𝒸 | 𝒸 𝒸 𝒸 | | 𝒸 | | 1 1 1 1 1 𝒸 1 𝒸 |
| 𝒸 𝒸 1 𝒸 | 1 𝒸 𝒸 | | 𝒸 | | 1 𝒸 1 𝒸 1 1 1 1 |

𝒸 = Code

MICROPROCESSOR PROVIDING ENCODED INFORMATION ON BYTE ENABLE LINES INDICATING WHETHER READING CODE OR DATA, LOCATION OF CODE/DATA ON DATA LINES, AND BIT WIDTH OF CODE/DATA

This is a continuation of application Ser. No. 07/942,380, filed Sep. 9, 1992, now abandoned.

BACKGROUND OF THE INVENTION

1. Field of the Invention

The invention relates to the field of microprocessors and microprocessor systems. More particularly, it relates to the field of making internally known access information of a microprocessor available to external circuits of a microprocessor system.

2. Description of Relevant Art

Methods for signalling whether a code or data access is being made to an external memory by a microprocessor are known in the art. One method relies on creating or devoting an entire separate signal pin to indicate the access type. The Intel 80386 TM CPU uses such a method. A "D/C#" pin specifies whether code or data is being accessed from external memory by the microprocessor. This method, however, requires an additional pin which is expensive and in limited supply on microprocessors.

A different method to relay the code/data information is employed by present microprocessors such as the Motorola 68000 and the Intel 80286. These microprocessors encode the information on a group of signal pins devoted to cycle type information. The Motorola 68000 encodes the information on FC2, FC1 and FC0 while the Intel 80286 encodes the information on pins S0 and S1. However, cycle type encoded information is not liked by users.

SUMMARY OF THE INVENTION

An apparatus in a computer to indicate the type of memory accesses being made is described. In the currently preferred embodiment a read/write line is provided to indicate read and write cycles. Additionally a plurality of address lines, and a plurality of byte enable lines are provided. When the read/write line indicates a write cycle the byte enables, signal on the byte enable lines which of the data lines are to be written into memory. When the read/write line indicates a read cycle the present invention teaches the use of a byte enable chaser circuit to indicate whether data or instructions are sought by the computer. If instructions are sought, a first predetermined bit pattern is placed on the byte enable lines to indicate both that instructions are sought and to indicate a first portion of an address. The second and remaining portion of the address is applied to the address lines. On the other hand, when data is sought by the computer a second predetermined bit pattern is applied to the byte enable lines. The bit pattern represents both the bit-width of the desired data and a first portion of an address. The second portion of an address is applied to the address lines.

BRIEF DESCRIPTION OF THE DRAWINGS

FIG. 2 shows the byte enable bit patterns which represent data accesses in the present invention.

FIG. 3 shows the byte enable bit patterns which represent code accesses in the present invention.

DETAILED DESCRIPTION OF THE PRESENT INVENTION

Figure 1:
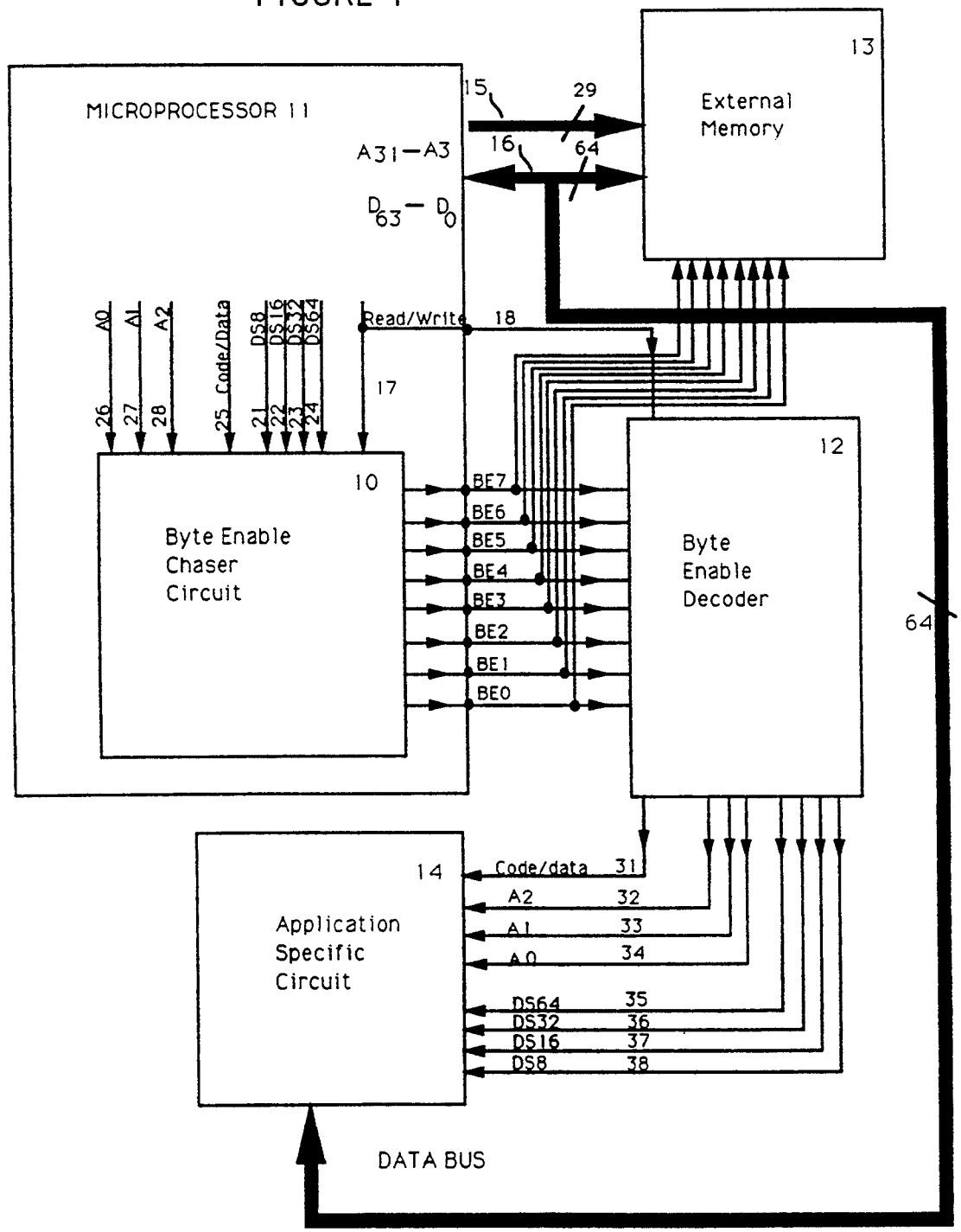
FIG. 1 is a block diagram of a computer system employing the microprocessor of the present invention. The microprocessor contains the invention's byte enable chaser circuit to encode information about the access sought by the microprocessor.

The present invention specifies a novel method and apparatus for distinguishing between code and data read cycles on a microprocessor's external bus using existing interface signals. In the following description numerous specific details are set forth in order to provide a thorough understanding of the present invention. However, it may be obvious to one skilled in the art that the present invention may be practiced without these specific details. In other instances well-known microprocessor concepts and circuits have not been set forth in detail in order to not unnecessarily obscure the present invention.

OVERVIEW OF THE PRESENT INVENTION

The currently preferred embodiment of the invention's microprocessor is able to access external memory through its internal bus interlace. Memory accesses are made to the executable portion of a program (code) or to program data. The microprocessor internally knows whether code or data is sought. It is, however, advantageous to make this information available to external circuits used in conjunction with the microprocessor. It is also valuable to have this information available for each bus cycle performed. For instance, logic analyzers need this information to trace back instructions executed earlier. Code and data access information is also valuable for routing requests of different buses or to closely monitor a sequence of instructions.

With the invention's microprocessor an address in memory is specified on a group of address lines during read cycles. The lowest order address signals (A2, A1, A0) do not explicitly exist but are implied by byte enable information. There is one byte enable line for each byte width of the data bus.

Byte enables are necessary for write cycles but not, in general, for read cycles. When the microprocessor is writing to external memory only the bytes of the data bus which the microprocessor wishes to write into memory are enabled. The byte enable signals prevent the microprocessor from writing irrelevant bytes of the data bus into memory. During read cycles the byte enables can be ignored by the external memory because the memory returns all of the bits contained at the addressed memory location. During read cycles, the present invention's microprocessor uses the byte enable lines to transfer encoded information specifying the type of access being made and the lower order address bits. Generally, there is no need to specify whether code or data is being accessed during write cycles because the accesses are only of data. Only during read cycles, when the byte enables are available, is there a need to distinguish between code and data accesses.

When the microprocessor initiates a read cycle, a read signal is indicated on a read/write line. During the read cycle, a code/data signal indicating whether code or data is being accessed is generated within the microprocessor. The microprocessor provides a 29-bit address signal (A31-A3) to external memory specifying the 64-bit location where the code or data may be found. The microprocessor also generates signals (A2, A1, A0) which specify the lower order bits of the address. The lower order address bits specify the location of the desired code or data on the 64-bit data bus. The microprocessor also internally generates access type signals which specify the number of bytes of its data bus required to hold the code or data. There is an access type signal (DS64, DS32, DS16, DS8). for each allowable string size of code or data. A 64-bit data bus has four allowable string sizes for the code and data: 64-bits, 32-bits, 16-bits, and 8-bits. Code accesses contain four bytes or 32-bits of information; therefore, code accesses; always generate an access type signal indicating four bytes (DS32).

During read cycles the above-mentioned signals are made available to the invention's byte enable chaser circuit where they are encoded. The encoder or byte enable chaser circuit is laid out on the microprocessor's silicon substrate with established methods using computer aided design to generate the hardwire logic. The present invention provides a means whereby code accesses can be encoded onto byte enable signal pins without duplicating the encoding of the data accesses.

During each read cycle the encoded code and data access information is made available on the byte enable signal pins for use by peripheral circuits of a microprocessor system. The information is available on the byte enable signal pins for each bus cycle. The encoded access information is decoded externally to the microprocessor with either reciprocal hardwired logic or software programs contained in a byte enable decoder. The microprocessor contains a read/write signal pin which alerts the decoding circuit that the byte enables are passing access information signals.

PRESENTLY PREFERRED EMBODIMENT OF THE INVENTION

In the currently preferred embodiment the microprocessor is realized on a single substrate employing complementary metal oxide semiconductor (CMOS) technology. Any one of a plurality of well-known processes may be used to implement the present invention. This application is related to copending application Ser. No. 7-309430, filed Feb. 10, 1989, now abandoned, and entitled "Bus Matrix for Preforming Dual-Operation Instructions within a Microprocessor", and to copending application Ser. No. 7-309429, filed Feb. 10, 1989, and entitled "Pipelined Floating-Point Load Instruction for a Microprocessor", now abandoned. Information regarding this invention can be found in the "Advanced Information Disclosure" for the Intel i860 ™ 64-bit microprocessor.

Referring to FIG. 1, the presently preferred embodiment is implemented with a 64-bit microprocessor 11. The microprocessor is coupled to external memory 13 by a 29-bit address bus 15, a 64-bit data bus 16, and eight byte enable signal lines, BE7-BE0. The microprocessor 11 is also coupled to the byte enable decoder 12 via the byte enable signal lines, BE7-BE0, and the read/write signal line 18. The byte enable decoder is coupled by access information lines 31-38 to the application specific circuit 14 which makes use of the access information. The application specific circuit 14 is also coupled by a 64-bit data bus to the data bus 16 coupling the microprocessor 11 and external memory 13.

When the microprocessor wishes to make a read from external memory a read cycle is initiated. A read cycle is comprised of three steps: a code or data fetch step, a code or data interpretation step, and an execution step. The microprocessor provides external memory with a 29-bit address (A31-A3) on the address bus 15 specifying the 64-bit location in memory where the code or data may be found.

During the fetch step of the read cycle the microprocessor makes a plurality of signals available to the byte enable chaser circuit 10. The microprocessor indicates on the read/write line 17 that the microprocessor is making a read from memory. The microprocessor indicates the bit width of the sought after code or data on one of the four access type lines 21, 22, 23, or 24. The microprocessor signals on the code/data line 25 whether an instruction or data is being accessed from memory. Finally, the lower order address bits (A0, A1, A2) are sent to the byte enable chaser circuit 10 on address signal lines 26, 27, and 28.

Having received the above-mentioned signals, the byte enable chaser circuit 10 checks the read/write line 17 to see if a read cycle has been initiated. If a read cycle has been initiated, the byte enable chaser circuit encodes into bit patterns the access information and outputs it on the eight byte enable signal pins, BE7 - BE0. The encoding done by the byte enable chaser circuit is implemented with a hardwired logic array designed by the inventor.

FIG. 2 shows the data access encoding of the byte enable chaser circuit 10. For data accesses the inputs to the byte enable chaser circuit are specified as the access type signals (DSS, DS16, DS32, DS64), the lower order address bit signals (A2, A1, A0), and the code/data signal. FIG. 2 also shows for each set of legal data inputs the bit patterns outputted by the byte enable chaser circuit on the eight byte enable signal pins.

FIG. 3, on the other hand, shows the code access encoding of the byte enable chaser circuit. For code accesses the inputs to the byte enable chaser circuit are specified as the access type signals (DS64, DS32, DS16, DS8), the lower order address bits (A2, A1, A0) and the code/data signal. FIG. 3 also shows for each set of legal code inputs the bit patterns outputted by the byte enable chaser circuit .

During data access read cycles, the byte enable chaser circuit outputs on the byte enable signal pins one of the fifteen bit patterns specified in FIG. 2. Each of the predetermined bit patterns indicates data is being sought, the bit width of the sought data, and the lower order bits of the data's address. The bit patterns are made available for each bus cycle.

During code access read cycles, the byte enable chaser circuit outputs on the byte enable signal pins one of the two bit patterns specified in FIG. 3. Each predetermined bit pattern indicates instructions are sought and the lower order address bits of the instruction's address. The bit patterns are made available for each bus cycle.

When the microprocessor wishes to write into external memory, a write cycle is begun. During write cycles there is no need to distinguish between code and data accesses so no encoding is necessary. The byte enable lines, therefore, can carryout their traditional function of indicating which bits or bytes of the data bus contain data to be written into memory.

The operation of the present invention, is set forth below. A 16-bit data read from external memory by a 64-bit microprocessor is shown. When the microprocessor makes a read from external memory, it initiates a read cycle. During the fetch step of the read cycle the address bus 15 provides external memory 13 with the location of the desired data.

The byte enable chaser circuit receives a data signal on the code/data line 25. Also at this time, the access type signal (DS16) indicating the string width or the number of bytes of the data bus required to hold the data is received on the access type line 22. A final group of signals (A2, A1 and A0) indicating the lower order address bits of the data's address are provided to the byte enable chaser circuit, 10, on the lower order address signal lines 26, 27, and 28. For this example we will assume that the lower order address bits are: A2=1, A1=0 and A3=0.

Having received the above-mentioned signals, the byte enabled chaser circuit 10 encodes the information into the bit pattern specified in FIG. 2. The byte enable chaser circuit 10 outputs the specified bit pattern on the microprocessor's eight temporarily unused byte enable signal pins (BE7 - BE0). We see from FIG. 2 that the byte enable signal pins, for this example, will output: BE7=1, BE6=1, BE5=0, BE4=0, BE3=1, BE2=1, BE1=1, and BE0=1.

The byte enable decoder 12 receives a read signal on the read/write line 18. The read signal indicates that the byte enable signal pins are outputting a bit pattern representing access information, The bit pattern is decoded by the byte enable decoder using the reciprocal logic of the byte enabled chaser circuit. The access information of the microprocessor is now available for use by circuits of the microprocessor system.

While the byte enable decoder 12 signals to external circuits of the microprocessor system the data access information, external memory returns the requested data to the microprocessor on the middle 16-bits of the data bus (i.e. D32 through D47), as indicated by the bit pattern on the byte enable signal pins. Finally, the microprocessor executes an instructions to process the data. At the end of the execution step, the read cycle is complete.

A method and apparatus for making internally generated access information of a microprocessor available on existing external signal pins has been described. The method and apparatus make possible the close monitoring of instruction steps executed by a microprocessor without creating new signal pins.

We claim:

1. In a processor having a plurality of external data signal lines, a plurality of external byte enable signal lines, and an external read/write line which indicates whether the processor is in a read cycle or in a write cycle, a method for providing information to components external to said processor about reads and writes made by said processor, said method comprising the steps of:
   checking a state of said read/write line to determine whether the processor is making a read from or a write to an external memory;
   if said read write/line indicates a read cycle, determining internally within said processor whether said processor is making a read of code or a read of data;
   when said read/write signal line indicates a write cycle said processor providing byte enable signals on said byte enable signal lines, said byte enable signals indicating which of said data signal line contain valid signals;
   when said read/write signal line indicates a read cycle and said determination indicates a read of code, said processor providing predetermined first bit patterns on said byte enable signal lines, wherein said first bit patterns are encoded signals indicating that code is sought, and a location of said code on said data signal lines; and
   when said read/write signal line indicates a read cycle and said determination indicates a read of data, said processor providing predetermined second bit patterns on said byte enable signal lines, wherein said second bit patterns are encoded signals indicating data is sought, a bit width of said sought data, and a location of said sought data on said data signal lines wherein said second bit patterns are different than said first bit patterns.

2. The method of claim 1 wherein the number of said plurality of byte enable signal lines is eight and the number of said plurality of data signal lines is sixty-four.

3. The method of claim 2 wherein one of said first bit patterns is: BE7=1, BE6=0, BE5=1, BE4=0, BE3=1, BE2=1, BE1=1, and BE0=1 for a code read in the upper 32-bits of said data signal lines.

4. The method of claim 2 wherein one of said first bit patterns is: BE7=1, BE6=1, BE5=1, BE4=1, BE3=1, BE2=0, BE1=1, and BE0=0 for a code read in the lower 32-bits of said data signal lines.

5. A processor which writes and reads code and data to and from an external memory comprising:
   a plurality of external byte enable signal lines;
   a plurality of external data signal lines;
   an external read/write signal line for indicating when said processor is in a read cycle or in a write cycle;
   a plurality of internal access type lines which indicate an allowable size of code or data;
   a plurality of internal lower order address lines which indicate a location of code or data on said external data signal lines;
   an internal code/data line for indicating whether code or data is being read from said external memory; and
   a circuit, wherein said circuit generates byte enable signals on said byte enable signal lines when said read/write line indicates write cycle, said byte enable signals indicating which of said data sign lines contain valid signals;
   said circuit generating predetermined first bit patterns on said byte enable signal lines when said read/write line indicates a read cycle and said code/data line indicates a code read, wherein said predetermined first bit patterns are encoded signals indicating that code is sought and a location of said code on said data signal lines;
   said circuit generating predetermined second bit patterns on said byte enable signal lines when said read/write line indicates a read cycle and said code/data line indicates a data read, wherein said predetermined second bit patterns are encoded signals indicating that data is sought, a bit width of said data, and a location of said data on said data signal lines wherein said second bit patterns are different than said first bit patterns;
   said circuit utilizing said code/data line, said internal access type lines, and said lower order address lines as inputs for generating said first and second predetermined bit patterns.

6. The processor of claim 5 wherein the number of said plurality of byte enable signal lines is eight, and the number of said data signal lines is sixty-four.

7. The processor of claim 6 wherein said second means provides a bit pattern on said byte enable signal lines of BE7=1, BE6=0, BE5=1, BE4=0, BE3=1, BE2=1, BE1=1, and BE0=1 for a code read in the upper 32-bits of said data signal lines.

8. The processor of claim 6 wherein said second means provides a bit pattern of BE7=1, BE6=1, BE5=1, BE4=1, BE3=1, BE2=0, BE1=1, and BE0=0 for a code read in the lower 32-bits of said data signal lines.

* * * * *

UNITED STATES PATENT AND TRADEMARK OFFICE
CERTIFICATE OF CORRECTION

PATENT NO.    : 5,379,443
DATED         : January 3, 1995
INVENTOR(S)   : Neal Margulis It is certified that error appears in the above-identified patent and that said Letters Patent is hereby corrected as shown below:

In the Abstratct at [57] at line 17 delete "signed" and insert --signal--

In column 2 at line 24 delete "interlace" and insert --interface--

In column 4 at line 28 delete "DSS" and insert --DS8--

In column 5 at line 63 delete "line" and insert --lines--

In column 6 at line 41 delete "sign" and insert --signal--

Signed and Sealed this

Nineteenth Day of August, 1997

Attest:

BRUCE LEHMAN

Attesting Officer

Commissioner of Patents and Trademarks